3,229,683
WATER HEATING APPARATUS

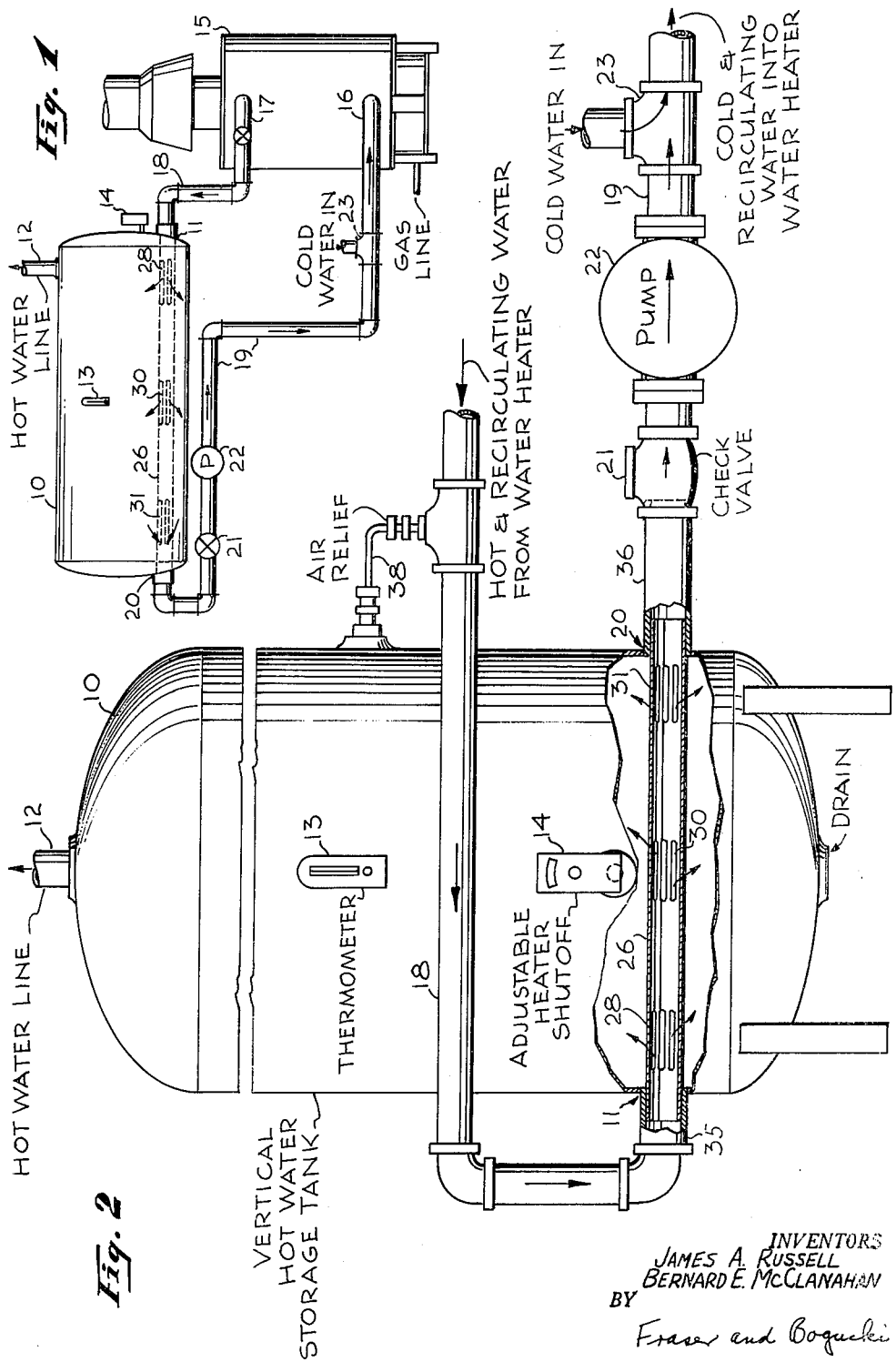

James A. Russell, Downey, and Bernard E. McClanahan, Whittier, Calif., assignors to Ace Tank and Heater Company, a corporation of California
Filed June 26, 1961, Ser. No. 119,615
1 Claim. (Cl. 126—362)

This invention relates, in general, to water heating apparatus and has for its principal object the provision of a new and improved apparatus for heating water with increased efficiency and whereby the required storage capacity of such apparatus may be materially reduced.

In existing hot water heating apparatus where a hot water heater is separate from a hot water storage tank and where water is circulated between the tank and the heater to heat and store hot water as needed, it has been found that only about 50% of the hot water in the storage tank is available at the desired temperature for a large or prolonged withdrawal of water from the storage tank. The reason that such a small percentage of the total water in the storage tank is available at the desired temperature is that, as hot water is drawn from the storage tank, the inflow of cold water from the water supply generates turbulence which mixes the cold water with enough of the hot water in the tank to reduce the temperature thereof below a point where it is usable at the desired temperature. When the need for hot water from the system is light or intermittent, the system recovery rate is adequate to heat the mixed cold and hot water to the desired temperature before all the unmixed hot water is drawn from the system. Enough reserve capacity must still be provided, however, to supply the normal demands on the system without the undesirable reduction in the temperature of the water being drawn which ordinarily follows from the turbulence effect.

Partial solutions to this problem have been suggested such as, for example, running the colder water from the water supply into a circulating line between the storage tank and the heater so that the colder water is partially heated before it enters the storage tank. This not only raises slightly the temperature of the water entering the storage tank but also achieves a somewhat improved efficiency of heat transfer within the heater. However, even in such a system, a steady or large withdrawal of hot water from the system does not prevent turbulence and the partially warmed water is soon mixed in great quantities to lower the temperature of the remaining water in the storage tank below the desired usable temperature.

Another partial solution to this problem has been to place a baffle, such as a closed cylinder with a number of perforations therein, within the storage tank so that cold water entering the tank is introduced within a baffle chamber as the hot water is being drawn from the system. This suggested solution reduces turbulence; however, it has a disadvantage in that the internally mounted cylinder must be installed in a storage tank during its manufacture. This of course does not permit the modification of existing hot water heating systems. Furthermore, it increases the cost of the finished hot water storage tank due to the additional steps and materials required in the manufacturing process.

So far as is known, none of the attempts to solve the particular problem set forth above has been completely successful, either because they are expensive or ineffective or inapplicable to existing installations. As a result, it is still the case that most such hot water heating systems employ a storage tank with a capacity nearly twice the actual anticipated maximum need in order to provide sufficient reserve to absorb the mixture of cold inlet water with the hot water in the lower half of the tank.

It is therefore, an object of this invention to provide a storage tank for a hot water heating system which encounters a minimum of mixing between cold inlet water and existing hot water within the tank during the drawing of hot water from the system.

It is also an object of this invention to provide a hot water storage tank in which cold inlet water enters the tank with a minimum of turbulence during the time that hot water is being drawn from the tank.

It is a further object of this invention to provide an arrangement for limiting the turbulence in a hot water storage tank which is simple and economical to install during fabrication of the tank.

It is an additional object of this invention to provide an arrangement for limiting turbulence in a hot water storage tank which may be added to already existing storage tanks readily and economically.

It is another object of this invention to provide an arrangement which may be added to the storage tank of a hot water heating system which will have the effect of substantially increasing the effective hot water storage capacity of the system.

Briefly, the invention provides a hot water heating system comprising a hot water storage tank and a separate but interconnected hot water heater wherein the storage tank is provided with a flow distribution tube mounted in the lower portion thereof. This flow distribution tube is of a length substantially equal to the horizontal span of the storage tank and is preferably of a diameter which will permit its insertion into the storage tank from the outside, i.e., through diametrically opposite holes which are already formed in conventional hot water storage tanks, so that, with conventional nipples, the flow distribution tube may readily be affixed within the storage tank. This enables the flow distribution tube to be incorporated in existing hot water tanks as well as to be installed during manufacture.

In one exemplary arrangement of the invention, the flow distribution tube is provided with a plurality of openings in the form of slots, preferably arranged in groups and distributed throughout the length of the tube within the storage tank, so that colder water may be introduced into the storage tank without significant turbulence and with a minimum of mixing with the existing hot water. The inlet end of the flow distribution tube is connected to the hot water heater outlet and the discharge end of the flow distribution tube is connected through a one-way check valve to a pump and thence to the inlet of the hot water heater. The pump serves to circulate the water between the storage tank and the hot water heater so that the water in the tank is raised to the desired tempertaure. Water from the cold water supply is arranged to be introduced into the heater return line immediately adjacent its inlet as hot water is drawn from the system at the hot water outlet pipe near the top of the storage tank. Cold water, thus introduced, is initially partially heated as it flows through the heater towards the storage tank. With the introduction of the colder water immediately prior to the heater in this manner, a maximum transfer of heat is effected. With continuous circulation of the water as driven by the circulating pump, the temperature of the water in the storage tank will reach its desired level.

Whenever hot water is drawn from the upper portion of the storage tank, cold water, only partially warmed by passage through the heater, is introduced into the tank through the aforementioned slots in the flow distribution tube with a minimum of disturbance. Lacking turbulence, the colder water remains in the lower portion of the storage tank and allows the hot water to rise gradually. Thus, a continuous or prolonged draw of a substantial amount of hot water from the storage tank is substantially unhampered by the introduction of colder water into the storage tank and more water at the desired elevated temperature is available in contrast to prior art systems of equal storage capacity.

During the time that hot water is being drawn, the check valve closes because of the pressure gradient from the cold water inlet to the hot water outlet. While the valve is closed, all of the slots in the flow distribution tube are available to release inlet water gently and evenly over the lower portion of the storage tank without significant turbulence and with a minimum of mixing with the stored hot water. When the draw of hot water ceases, the pressure gradient changes, the check valve opens under the pressure from the circulating pump, and water from the lower portion of the tank is circulated to the heater where it is heated and returned to the storage tank. During circulation of the water in this fashion, the slots near one end of the flow distribution tube permit the water from the tank to enter the circulation line on the way to the heater while the slots near the other end of the tube permit the heated water to re-enter the storage tank, again with a minimum of mixing due to the reduced turbulence. Eventually, as the water is continuously circulated thus, the entire contents of the storage tank are raised to the desired temperature and the fuel to the heater is shut off under the control of a thermostat attached to the system.

Advantageously, in accordance with an aspect of the invention, the flow distribution tube is arranged with a particular shape and configuration so that it may readily be installed in existing hot water storage tanks. It is customary to manufacture such tanks with threaded holes of suitable size at opposite sides of the tank near the base. The connections to the circulation line between the tank and the heater are then customarily made to these holes without regard to the turbulence effects experienced with such an arrangement. To install the exemplary flow distribution tube of the invention in such an existing tank, a tube is selected which is slightly longer than the distance between the holes at opposite sides of the tank. Short nipples are coupled into the respective threaded holes and the tube is inserted through the respective nipples so that its opposite ends rest therein with the slots along its length positioned appropriately within the tank. It is desirable to affix the flow distribution tube in position laterally to prevent its displacement within the storage tank, as might otherwise occur under the pressure of circulating water. This may be accomplished by spot soldering the tube at one end to the associated nipple or by press-fitting the tube therein. Installed in this fashion, the flow distribution tube functions as described above and serves to limit turbulence within already existing hot water storage tanks as well as in newly fabricated systems.

A better understanding of the invention may be gained from a consideration of the following description, taken in conjunction with the drawings wherein like elements have been given like numeral designations and in which:

FIG. 1 represents a hot water heating system in accordance with the invention; and FIG. 2 illustrates in greater detail a hot water storage tank incorporating an arrangement of the invention.

Turning now to FIG. 1 it can be seen that there is illustrated a horizontal hot water tank 10 having an inlet 11 adjacent the lower portion of the tank and an outlet 12 at the top of the tank for the supply of hot water to a hot water consumption device (not shown). The hot water storage tank 10 is provided with a conventional thermometer 13 and a thermostat 14 for controlling the operation of a separate hot water heater, indicated in its entirety as 15. The hot water heater 15 is provided with an inlet 16 and an outlet 17; the latter being connected by a pipe 18 which connects to the storage tank inlet 11 in the conventional manner and which forms a part of the connecting line, completed by the return pipe 19, between the storage tank 10 and the heater 15 for the circulation of water as will now be described.

At the end of the hot water storage tank opposite the inlet 11, there is also provided an outlet 20 which is connected by piping 19 back to the inlet 16 of the hot water heater 15. A suitable check valve 21 is provided to prevent return flow of water as it leaves the outlet 20. Disposed between the check valve 21 and the inlet 16 to the water heater 15 is a water pump 22 of any conventional type. A T 23 is connected in the return line 19 between the pump 22 and the water heater inlet 16 for the admission of water from a suitable source of water supply (not shown). In this manner, cold water from the water supply is supplied directly to the heater 15 as it is introduced into the system so that the maximum transfer of heat between the heater and the cold water is provided.

Reference is now made to FIG. 2 wherein a vertical hot water storage tank for use in the system of FIG. 1 is shown in greater detail. As previously mentioned, an important aspect of this invention is the circulation of water between the heater 15 and the storage tank 10 and the introduction of water into the storage tank 10 with a minimum of turbulence. This is accomplished in accordance with the invention by the provision of a flow distribution tube 26, which is connected between the tank inlet 11 and the tank outlet 20. The flow distribution tube 26, being located in the lower portion of the tank 10 in the embodiment illustrated is provided with groups of slots as at 28, 30 and 31. Each group of slots comprises a plurality of elongated openings equally spaced peripherally about the tube 26 so that water may pass through the slots between the tube 26 and the storage tank 10 without excessive turbulence, thus reducing the mixing of cold water or cooler water with the previously heated water in the tank and increasing the quantity of hot water available at the desired temperature from a tank of a given capacity. It can be appreciated that with this arrangement cold water which is introduced into the system as hot water is drawn off via the outlet 12 remains in the lower portion of the tank and does not cool any substantial portion of the hot water which is allowed to rise gradually. Depending upon the rate at which hot water is being drawn from the outlet 12, several or all of the slots of the groups 28, 30 and 31 of the flow distribution tube 26 will transmit water into the tank 10 as shown by the arrows in FIG. 2. Thus even though the hot water may be drawn off at a maximum rate, the cold water entering the tank 10 is distributed evenly and at low velocity across the bottom thereof so that a minimum of turbulence and resultant mixing with the hot water takes place. During such time, the check valve 21 blocks the flow of cold water directly into the tank 10 and the pump 22 simply idles. When the draw of hot water ceases, the check valve 21 opens under pressure from the pump 22 and water is circulated around the line comprising the pipes 18, 19 between the tank 10 and the heater 15. The direction of water flow through the slots in the tube 26 nearer the outlet 20 may now reverse to accord to the direction indicated by the arrows in FIG. 1. In this way the water in the tank 10 is heated by the heater 15 during the period when little or no hot water is drawn from the outlet 12. When the water temperature reaches a preset level, the supply of fuel to the heater 15 may be cut off under the control of the thermostat 14 as is known.

The portion of a water heating system shown in FIG. 2 includes an air relief passage 38 which is connected by suitable fittings between the tank 10 and the pipe 18. In this arrangement of the invention the air relief passage 38 serves to prevent the entrapment of air within the system which otherwise might ultimately block circulation of water between the storage tank and the heater. Such an air relief passage is not required in the arrangement shown in FIG. 1 where the slotted tube 26 is positioned at the uppermost point in the circulation line.

In accordance with an aspect of the invention, the opposite ends of the flow distribution tube 26 rest in respective conventional pipe nipples 35 and 36. The tube 26 is selected to be of an appropriate length so that it extends slightly outside the water storage tank 10 on both ends. In order to prevent longitudinal movement of the tube 26 which might otherwise occur under the influence of water flow within the system, it is usually desirable to affix one end of the tube 26 to one of the nipples 35, 36 in a suitable manner as by spot-soldering or by a press-fit relationship between the tube 26 and the nipple. Since the water main pressure is contained by the tank 10 and the nipples 35, 36 rather than by the tube 26, the latter may advantageously be fabricated of relatively thin brass stock, thus providing the desired operation of the water system of the invention without the necessity of an expensive installation. Furthermore, because the diameter of the tube 26 is arranged in accordance with an aspect of the invention to fit within the connecting nipples 35, 36, the tube 26 may be installed even after the fabrication of the tank 10. All that is required to provide the arrangement as shown is that the tank 10 contain a pair of threaded holes at opposite sides thereof. Since most such water storage tanks now in service are constructed with the required holes, this presents no problem and it can be seen that the described arrangement of the invention can readily be added to existing hot water system installations with a minimum of effort and expense. Varying lengths for the flow distribution tube 26 may be provided in order to accommodate different sizes of tanks as for example a horizontal type shown in FIG. 1 or a vertical type shown in FIG. 2.

The above described arrangements of the invention illustrate how the invention may be utilized to provide a simple and economical improvement in water heating systems both those already in use and those presently being manufactured. Tests on typical water storage tanks both with and without the flow distribution tube of the invention have demonstrated that the use of one particular arrangement of the invention permits 82% of the capacity of the storage tank to be usable as hot water when a steady draw of water from the tank is maintained as compared with a figure of only 50% of the water being so usable when the flow distribution tube is not employed. Thus the practice of the invention provides a 64% increase in the effective capacity of a given hot water storage tank and this desirable increase is accomplished with a readily provided modification at minimum additional cost.

Although there have been described above specific arrangements of a hot water heating system in accordance with the invention for the purpose of illustrating the manner in which the invention may be used to advantage, it will be appreciated that the invention is not limited thereto. Accordingly, any and all modifications, variations or equivalent arrangements falling within the scope of the annexed claim should be considered to be a part of the invention.

What is claimed is:

In a hot water heating apparatus comprising
a storage tank having in its lower portion a tank outlet and a tank inlet,
a flow distribution tube having openings along its length positioned in the lower portion of the storage tank and connected to said tank outlet and said tank inlet,
a hot water outlet at the top portion of the storage tank,
a water heater,
connecting pipes connecting said tank outlet and tank inlet to said heater to provide a complete circulation line between the tank and the heater,
a circulation pump connected in said line upstream of said heater,
a cold water inlet connected between the pump and the heater for continually replacing water drawn from the hot water outlet,
a check valve connected in said line between said tank outlet and said pump, said circulation pump and said check valve having operating characteristics such that in response to the pressure gradient from the cold water inlet to the hot water outlet during discharge of water from the hot water outlet the check valve closes thereby rendering the pumping action of said circulation pump ineffective for causing circulation of water between said storage tank and said heater,
said flow distribution tube being an elongated, perforated, substantially straight hollow tube having a size suitable for insertion and removal through said tank inlet and said tank outlet.

References Cited by the Examiner
UNITED STATES PATENTS

| | | | |
|---|---|---|---|
| 588,016 | 8/1897 | Sadtler | 126—362 |
| 589,454 | 9/1897 | Winters | 126—362 |
| 1,458,876 | 6/1923 | Confer | 122—20 |
| 1,577,863 | 3/1926 | Kercher | 126—362 |
| 1,890,263 | 12/1932 | Parent | 126—362 X |
| 1,948,735 | 2/1934 | Russo | 122—20 |
| 2,004,390 | 6/1935 | Benzinger | 165—137 |
| 2,193,466 | 3/1940 | Raymond | 137—590 |
| 2,359,547 | 10/1944 | Colby | 237—63 X |
| 2,533,097 | 12/1950 | Dale | 285—302 |
| 2,602,465 | 7/1952 | Goehring | 137—592 X |
| 2,676,584 | 4/1954 | McGonigle | 126—362 |
| 2,899,218 | 8/1959 | Creighton | 285—302 |
| 2,954,049 | 9/1960 | Wallace | 137—590 |

FREDERICK L. MATTESON, JR., *Primary Examiner.*

PERCY L. PATRICK, JAMES W. WESTHAVER, ROBERT A. DUA, *Examiners.*